US010318269B2

(12) United States Patent
Tiles

(10) Patent No.: US 10,318,269 B2
(45) Date of Patent: Jun. 11, 2019

(54) PROVIDING VEHICLE SYSTEM MODULE UPDATES

(71) Applicant: General Motors LLC, Detroit, MI (US)

(72) Inventor: Rafael Tiles, Bloomfield Hills, MI (US)

(73) Assignee: General Motors LLC, Detroit, MI (US)

(*) Notice: Subject to any disclaimer, the term of this patent is extended or adjusted under 35 U.S.C. 154(b) by 80 days.

(21) Appl. No.: 15/146,290

(22) Filed: May 4, 2016

(65) Prior Publication Data

US 2017/0322791 A1   Nov. 9, 2017

(51) Int. Cl.
G06F 8/65 (2018.01)

(52) U.S. Cl.
CPC ..................... *G06F 8/65* (2013.01)

(58) Field of Classification Search
CPC ........................................ G06F 8/65
USPC ........................................ 717/171
See application file for complete search history.

(56) References Cited

U.S. PATENT DOCUMENTS

| 7,502,672 | B1 * | 3/2009 | Kolls | G06Q 30/02 340/988 |
| 2002/0098853 | A1 * | 7/2002 | Chrumka | G08G 1/202 455/456.2 |
| 2004/0249934 | A1 * | 12/2004 | Anderson | G06F 8/65 709/224 |
| 2005/0038581 | A1 * | 2/2005 | Kapolka | G07C 5/008 701/31.4 |
| 2005/0256614 | A1 * | 11/2005 | Habermas | G06F 8/65 701/1 |
| 2005/0262498 | A1 * | 11/2005 | Ferguson | G06F 8/65 717/172 |
| 2007/0171029 | A1 * | 7/2007 | Inbarajan | G06Q 10/00 340/425.5 |
| 2007/0179800 | A1 | 8/2007 | Oesterling | |
| 2010/0115505 | A1 * | 5/2010 | Touati | G07C 5/008 717/171 |
| 2012/0044089 | A1 * | 2/2012 | Yarnold | G08G 1/202 340/901 |
| 2014/0109075 | A1 * | 4/2014 | Hoffman | G06F 8/65 717/169 |
| 2014/0282470 | A1 * | 9/2014 | Buga | G06F 8/65 717/170 |
| 2014/0380296 | A1 * | 12/2014 | Pal | G06F 8/65 717/171 |
| 2015/0193220 | A1 * | 7/2015 | Rork | G06Q 10/20 717/170 |

(Continued)

*Primary Examiner* — James J Lee
*Assistant Examiner* — Zengpu Wei
(74) *Attorney, Agent, or Firm* — David Willoughby; Reising Ethington P.C.

(57) ABSTRACT

A communication system that includes a backend system and a vehicle. A method of using the communication system to remotely provide system module updates for the vehicle. The method includes: generating at a vehicle backend system an electronic message (e-mail) that includes an update for a vehicle system module (VSM) in the vehicle; storing the e-mail at a mail cache server, the cache server being associated with the backend system; and when the vehicle becomes associated with a backend services agreement, then delivering the e-mail stored at the cache server to the vehicle via a cellular link so that the update may be applied to the VSM.

16 Claims, 3 Drawing Sheets

(56) References Cited

U.S. PATENT DOCUMENTS

2016/0070559 A1\* 3/2016 West .................... G06F 8/65
                                                                       717/172

\* cited by examiner

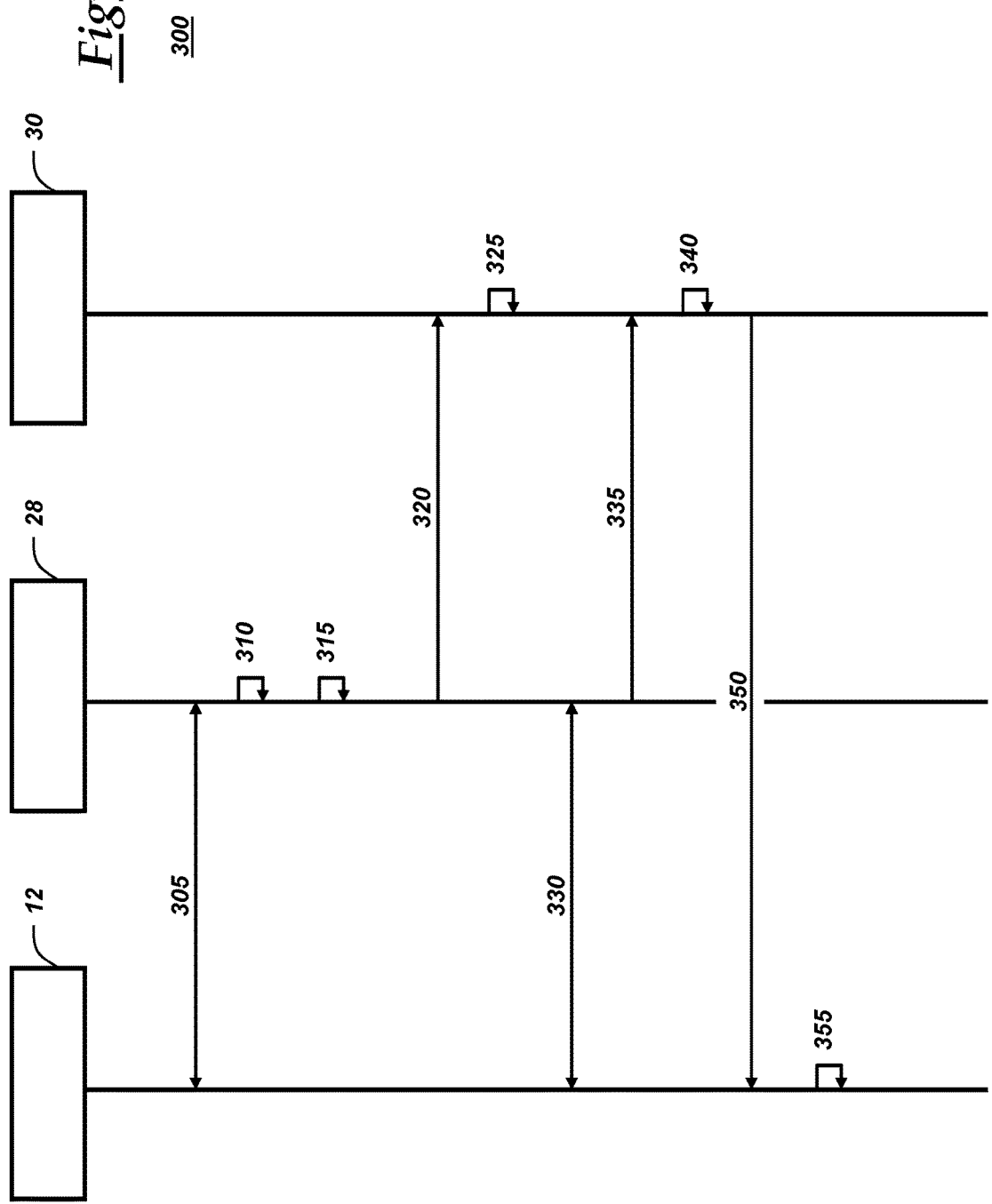

PROVIDING VEHICLE SYSTEM MODULE UPDATES

TECHNICAL FIELD

The present invention relates to remotely providing vehicle system module updates.

BACKGROUND

After a new vehicle is delivered to a customer, it is sometimes desirable to update software therein used by the electronic vehicle modules. In some instances, a software update may be received at the vehicle wirelessly via a remotely located computer server when the vehicle is a wireless subscriber (e.g., is associated with a wireless service agreement). However, when the vehicle is not a subscriber (or e.g., when the agreement lapses), software updates may be missed and not received. Assuming the agreement is later renewed, new software updates may be wirelessly provided to the vehicle. However, these newer updates may be incompatible with the electronic vehicle modules without first installing one or more updates missed during the interim (i.e., during the period of non-subscribership). Therefore, there is a need for a process to receive and install any missed interim updates before installing the newer updates.

SUMMARY

According to an embodiment of the invention, there is provided a method of remotely providing system module updates for a vehicle. The method includes: generating at a vehicle backend system an electronic message (e-mail) that includes an update for a first vehicle system module (VSM) in the vehicle; storing the e-mail at a mail cache server, the cache server being associated with the backend system; and when the vehicle becomes associated with a backend services agreement, then delivering the e-mail stored at the cache server to the vehicle via a cellular link so that the update may be applied to the first VSM.

According to another embodiment of the invention, there is provided a method of receiving system module updates for a vehicle from a remotely located backend system. The method includes the steps of: ceasing to receive e-mail from the backend system as a result a termination of a backend services agreement between a user of the vehicle and the backend system; then, receiving an e-mail at the vehicle via a cellular link from a cache server which stored the e-mail during a subscription lapse period; extracting a software update or a firmware update from the e-mail; and installing the software or firmware update at a vehicle system module (VSM) in the vehicle.

BRIEF DESCRIPTION OF THE DRAWINGS

One or more embodiments of the invention will hereinafter be described in conjunction with the appended drawings, wherein like designations denote like elements, and wherein:

FIG. 3 is a flow diagram illustrating a method of using the communication system to provide updates to the vehicle.

DETAILED DESCRIPTION OF THE ILLUSTRATED EMBODIMENT(S)

Telematics-equipped vehicles may be configured to receive and install software and/or firmware updates received from a vehicle backend system; e.g., updates for electronic control units (ECUs) of one or more system modules within the vehicle. In many instances, these updates may occur automatically or be automatically initiated (e.g., without prompting by a user of the vehicle). In at least some implementations, these updates (e.g., which include reflash updates—e.g., an update to the BIOS or basic input output system of an ECU) are received via a cellular link between a vehicle telematics unit and the backend system according to a subscription agreement that involves receiving vehicle backend services via a wireless service provider (WSP). For example, the backend system may provide to the vehicle user a subscription agreement associated with a WSP used by the backend system. If the user discontinues the vehicle backend services (e.g., terminates the agreement or the agreement lapses), the capability to receive services via the cellular link also may cease. In these instances, newly released updates may be generated for the vehicle's ECUs; however, these updates may not be installed during the subscription lapse period. For example, they may be e-mailed by the backend system; however, they may never arrive at the target vehicle if vehicle cellular connectivity has lapsed. Later, when the user renews the subscription agreement and begins receiving updates again, the later updates may not be compatible with the vehicle ECUs—without first installing the missed and intervening (or interim) updates (e.g., those generated during the subscription lapse period).

The method discussed below involves the newly-renewed subscriber vehicle utilizing a specially configured cache server in order to receive and install the missed or intervening updates for its ECUs. As will be discussed below, the vehicle not only may receive all missed updates, but install them in the most desirable sequence—e.g., to ensure that later received updates enable the respective ECU (or VSM) to function or operate properly. In addition, the method described below identifies updates associated with vehicle-safety VSMs (e.g., a vehicle braking system) and ensure that the updates occur only when the vehicle is not moving, etc.

Communications System—

Figure 1:
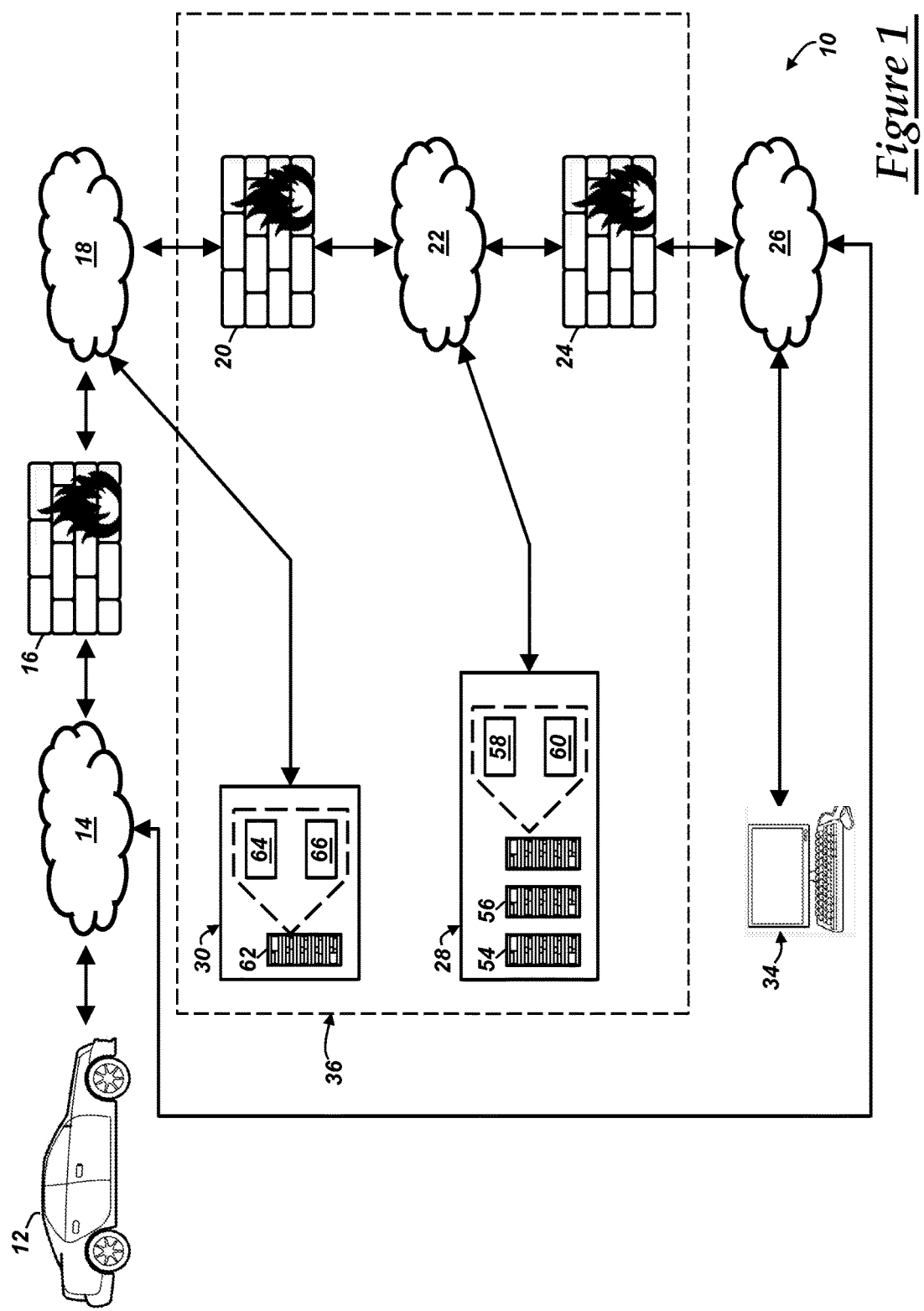
FIG. 1 is a block diagram depicting an embodiment of a communications system that is capable of utilizing the method disclosed herein.

FIG. 1 illustrates an exemplary operating environment of a communication system 10 that includes a vehicle 12, a wireless carrier system 14, a carrier system firewall 16, a wireless carrier system (WSP) demilitarized zone (DMZ) 18, a first control firewall 20, a secure area network 22 (e.g., a local or wide area network (e.g., LAN or WAN)), a second control firewall 24, a land or internet network 26, a backend electronic mail (e-mail) server 28, an e-mail content delivery server 30, and an electronic device 34. In at least one embodiment, a vehicle backend system 36 includes the first control firewall 20, the secure area network 22, the second control firewall 24, the backend e-mail server 28, and the e-mail content delivery server 30. The illustrated communication system is merely an example; other communication systems could utilize at least some components which are different to carry out the method described herein.

Figure 2:
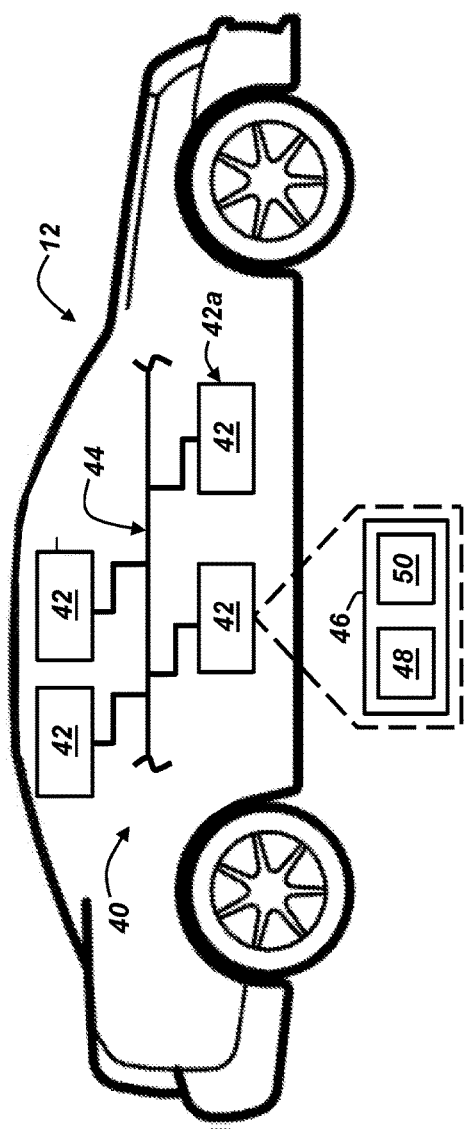
FIG. 2 is a schematic diagram of a vehicle shown in FIG. 1.

As also shown in FIG. 2, vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The vehicle 12 may include a vehicle communication system 40 that includes a number of vehicle system modules (VSMs) 42 interconnected using one or more network connections 44.

VSMs 42 may be in the form of electronic hardware components that are located throughout the vehicle and which typically receive input from one or more sensors (not shown) and use the sensed input to perform diagnostic, monitoring, control, reporting, and/or other functions. Non-limiting examples of VSMs include an engine control module that may control various aspects of engine operation such as fuel ignition and ignition timing, a powertrain module that can regulate operation of one or more transmission components, a body control module for controlling various electrical components located throughout the vehicle, and a vehicle telematics unit 42a for wireless communication, navigation and the like.

Each of the VSMs 42 may each include an electronic control unit (ECU) 46 that comprises memory 48 and one or more processors 50. The memory 48 may include non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Processor(s) 50 can be any type of device capable of processing electronic instructions including microprocessors, microcontrollers, host processors, controllers, vehicle communication processors, and application specific integrated circuits (ASICs). It can be a dedicated processor used only for the particular VSM 42 or can be shared with other vehicle systems. Processor 50 may be configured to execute various types of digitally-stored instructions, such as software or firmware programs stored in memory 48, which enable the particular VSM 42 to provide one or more predetermined services for a user of the vehicle and/or the vehicle backend 36. For example, the ECU 46 using processor 50 can execute programs or process data to carry out at least a part of the method discussed herein. For example, in at least one embodiment, at least one of the ECUs 46 may receive and execute a software or firmware update in response to a change in vehicle subscriber status (e.g., a change in status from non-subscriber to subscriber). As will be explained in greater detail below, updates may reconfigure VSM (or ECU) firmware, software, or the like (e.g., and in at least one implementation, the updates are reflash updates).

Telematics unit 42a—one of the VSMs 42—may be an OEM-installed (embedded) or aftermarket device that is installed in the vehicle 12 and that enables wireless voice and/or data communication over wireless carrier system 14 and via wireless networking. In at least one embodiment, the telematics unit 42a comprises at least one cellular chipset. This may enable the vehicle 12 to communicate with the backend system 36, other telematics-enabled vehicles, or some other entity or device. The telematics unit 42a preferably uses radio transmissions to establish a communications channel (a voice channel and/or a data channel) with wireless carrier system 14 so that voice and/or data transmissions can be sent and received over the channel. By providing both voice and data communication, telematics unit 42a enables the vehicle 12 to offer a number of different services including those related to navigation, telephony, emergency assistance, diagnostics, infotainment, etc. For example, data can be sent either via a data connection, such as via packet data transmission over a data channel, or via a voice channel using techniques known in the art. Non-limiting examples of telematics unit capabilities include operating over a cellular link (e.g., GSM, CDMA, LTE, etc. standards), a short range wireless communication (SRWC) link (e.g., Wi-Fi, W-Fi Direct, Bluetooth, etc. standards), other communication techniques, or any combination thereof.

Network connections 44 may include any suitable wired or wireless communication equipment. Non-limiting and exemplary network connections 44 include discrete connections, a communications or entertainment bus, etc.; e.g., using a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

In at least one embodiment, one of the VSMs 42 is the vehicle telematics unit 42a which receives a software and/or firmware update from the vehicle backend system 36 via a cellular link. Thereafter, the telematics unit or other suitable VSM 42 determines whether to execute the update, and when the update is executed, the telematics unit 42a or other appropriate VSM 42 is updated accordingly. Of course, the update could be received in other ways as well; e.g., via a SRWC link or wired communication link.

Returning now to FIG. 1, the wireless carrier system 14 is preferably a cellular telephone system that includes a plurality of cell towers, one or more cellular nodes (e.g., eNodeBs, mobile switching centers, or the like), as well as any other networking components required to connect wireless carrier system 14 with land network 26 and/or vehicle backend system 36 (e.g., via one or more firewalls 16, 20, 24 and other components). Cell towers, cellular nodes, and other infrastructure—as well as how the system 14 is interconnected and used—is known in the art; therefore, neither it nor the processes used to carry out communicating via the wireless carrier system 14 will be described further herein. Non-limiting examples of system 14 include analog technologies such as AMPS, and/or newer digital technologies such as CDMA, CDMA2000, GSM/GPRS, and LTE, just to name a few examples.

The carrier system firewall 16 may be any suitable firewall employed by a wireless service provider (WSP). As used herein, a WSP is an entity that utilizes the wireless carrier system 14 to provide or facilitate cellular service to wireless subscribers. Wireless subscriber vehicles may have a subscription agreement directly with the WSP, or in at least one embodiment, the wireless subscriber vehicle has a backend services agreement with the vehicle backend system 36. And the vehicle backend system 36 has a separate agreement with the WSP so that the WSP will provide or facilitate cellular service between the vehicle 12 and the backend system 36. In this manner, the backend system 36 not only provides cellular connectivity to vehicle 12, but also provides the vehicle a wide range of services via the backend itself—e.g., such as providing firmware and/or software updates to vehicle system modules, turn-by-turn directions, roadside and/or emergency assistance, etc.

Thus, the carrier system firewall 16 includes any hardware, software, or combination thereof employed by the WSP to inhibit or deter unwanted connectivity or wireless connection traffic—e.g., between a trusted source (e.g., the vehicle backend system 36) and an untrusted source (e.g., an unknown or unidentifiable cellular device). In at least one implementation, the firewall 16 is embodied as software—e.g., on a WSP computer or server. Firewalls, as well as their implementation, are known in the art and will not be described further herein.

The WSP DMZ 18 (also called a perimeter network) includes any suitable network or sub-network embodied in hardware, software, or a combination thereof to separate an internal local area network or LAN (e.g., associated with the WSP or backend system 36) from untrusted sources (e.g., attempting to connect via the wireless carrier system 14). Typically, it is employed as an additional layer of security around a wide or local area network such as network 22. Again, DMZs, as well as their implementation, are known in the art and will not be described further herein.

First and second firewalls 20, 24 include any suitable firewall employed by the backend system 36. The firewalls 20, 24 may be adapted to separate the backend system 36 from the wireless carrier system 14 and the land network 26, respectively. In at least one embodiment, firewall 20 may be the same as or similar to firewall 24 (i.e., the firewalls 20, 24 may be adapted to separate the rest of the backend system 36 from both the wireless carrier system 14 and the land network 26.

Secure area network 22 may be any suitable network behind the firewalls 20, 24 and the carrier firewall 16 and DMZ 18. For example, secure area network 22 may include one or more servers or networked computers, as well as any number of data storage devices—all protected by the DMZ 18 and/or firewalls 16, 20, 24. Secure area networks and their implementation and use are known to skilled artisans and thus will not be described further here.

Land network 26 may be a conventional land-based telecommunications network that is connected to one or more landline telephones. For example, land network 26 may include a public switched telephone network (PSTN) such as that used to provide hardwired telephony, packet-switched data communications, and the Internet infrastructure. One or more segments of land network 26 could be implemented through the use of a standard wired network, a fiber or other optical network, a cable network, power lines, other wireless networks such as wireless local area networks (WLANs), or networks providing broadband wireless access (BWA), or any combination thereof. As shown in FIG. 1, the secure area network 22 can be connected to the land network 26, and in some instances, land network 26 can be directly coupled to the wireless carrier system 14.

Backend e-mail server 28 includes one or more computers configured to receive and deliver e-mail messages to telematics-equipped vehicles (such as vehicle 12). In addition, e-mail messages provided by backend e-mail server 28 may carry or include one or more software and/or firmware updates (e.g., such as a reflash update). In some embodiments, the same update is transmitted to a number of vehicles from the backend system 36 (e.g., simultaneously or approximately so). In some instances, as will be described below, the target vehicles (or target ECUs of many vehicles) first are identified by the backend system 36; then the update is transmitted to the specific target vehicles. The backend system 36 may identify or address the target vehicles, e.g., using an e-mail address (e.g., VIN@domain_name.com, where VIN is the vehicle's identification number), a VSM identifier, an ECU identifier, a software or firmware version identifier, or the like. When the target vehicle has cellular connectivity (e.g., and a wireless subscriber agreement), then the e-mail may be delivered to the target vehicle. However, in at least some instances, when the target vehicle has no cellular connectivity and/or no wireless subscriber agreement with the backend system, the e-mail message may be transmitted but not reach the particular target vehicle (e.g., the e-mail message may be undeliverable).

Backend e-mail server 28 includes a mail server 54 which may utilize a conventional Mail Transfer Agent (MTA), a conventional Mail Delivery Agent (MDA), or both. The mail server 54 may be integral to server 28 or may be a separate computer device. Further, server 28 includes an attachment server 56 adapted to determine which vehicles 12 have out-dated ECU firmware or software. Attachment server 56 may be configured to control delivery timing of the updates (e.g., outbound e-mail), as well as to determine whether updates were received by and/or installed within the respective vehicles 12 (e.g., delivery receipt messaging). In addition, when e-mail communication occurs between the backend e-mail server 28 and vehicle 12, attachment server 56 may encrypt and/or decrypt the e-mail messages communicated there-between according to any suitable technique. Like server 54, attachment server 56 may be integral to server 28 or may be a separate computer device.

The backend e-mail server 28 may include other computers and servers and/or may be adapted to perform other functions or services as well (e.g., may include static and/or dynamic domain name server(s)). Each of the computers and servers associated with backend e-mail server 28 may include non-transitory storage media or memory 58 and one or more processors or processing units 60, and the respective processor(s) 60 may be adapted to execute instructions configured in hardware, software, or a combination thereof. For example, attachment server 56 may include software instructions for determining updates for a variety of vehicles (e.g., for ECUs such as ECU 46) and software instructions associated with e-mail delivery to those vehicles. These instructions may include encryption of updates within an e-mail message, encryption of the e-mail itself, or both.

Other instructions used by backend e-mail server 28 may include instructions associated with storage of delivered update content, delivery times (e.g., including scheduled delivery times), delivery receipts (e.g., from the respective vehicles 12), etc. For example, at least one computer of server 28 is associated with a file directory structure for multiple vehicles; e.g., wherein the structure stores update content (e.g., associated with updates) and is associated with different vehicle makes, models, VSMs 42, VSM ECUs 46, etc. The update content may be stored for a predetermined duration of time (e.g., 15 years, 20 years, etc.). In addition, other backend e-mail server instructions may include interactive software to determine the contents of e-mail content delivery server 30 (e.g., the content and quantity of pending messages being stored there, the storage durations of the pending messages, any statuses associated with the pending messages, etc.).

In at least one embodiment, backend e-mail server 28 further comprises at least one computer or server for performing data analysis. For example, this computer or server may be configured to compile, aggregate, interpret, and present data received from one or more vehicles (such as vehicle 12). The analyzed data then may be used for a variety of purposes. In one non-limiting example, such analyzed data may include diagnostic trouble code (DTC) data associated with software and/or firmware updates provided to one or more vehicles. After compilation, aggregation, interpretation, etc., the analyzed data may be presented to the vehicle user, to technicians and engineers associated with the backend system 36, or both. The analyzed data may be transmitted using land network 26, the wireless carrier system 14, or both and thereafter received using at least one electronic device 34.

Turning now to the content delivery server 30 shown in FIG. 1 (also part of backend system 36), the content delivery server 30 includes a mail cache server 62 and operates in accordance with a network time protocol (NTP) and data loss prevention (DLP) techniques. Mail cache server 62 includes one or more computers configured in hardware, software, or the like to receive and store e-mail messages containing software and/or firmware updates. For example, the server 62 may receive the updates from the backend e-mail server 28 (e.g., more specifically, from mail server 54). The storage duration at the cache server 62 may vary—e.g., depending upon the cellular connectivity of vehicle 12. For example, in one embodiment, these e-mail messages may be stored until the vehicle 12 becomes again associated with a backend services agreement. In another embodiment, the duration of e-mail message storage is capped or limited; i.e., stored for no longer than a predetermined duration of time (e.g., 15 years, 20 years, etc.).

It should be appreciated that when vehicle 12 is associated with an active backend services agreement, software and/or firmware updates can be transmitted from the backend e-mail server 28 directly to the vehicle 12 (e.g., via the secure area network 22, the first firewall 20, the carrier firewall 16 and DMZ 18, and the wireless carrier system 14). And when the vehicle 12 is not associated with a backend services agreement (i.e., not currently a subscriber vehicle or was a previous subscriber vehicle for which the subscription agreement has lapsed), then the software and/or firmware updates may not be delivered to vehicle 12, but instead delivered to the mail cache server 62 and stored there (e.g., transmitted from the mail server 54 via the secure area network 22, the first firewall 20, and the carrier DMZ 18 to the mail cache server 62). Of course, in some implementations, the mail cache server 62 also may store e-mail messages for brief periods of vehicle disconnectivity and attempt re-delivery after a short duration—e.g., while the vehicle is disconnected due to being in a remote location, subterranean parking garage, etc.

Content delivery server 30 may utilize conventional NTP techniques—e.g., it may synchronize interactions between the cache server 62 and the telematics unit 42a. Further, using conventional DLP techniques, platform 30 may identify and minimize data security breaches associated with e-mail messages delivered from the cache server 62.

Mail cache server 62 (as well as any other computers or servers associated with server 30) may include any suitable non-transitory storage media or memory 64 and one or more processors or processing units 66, and the respective processor(s) 66 may be adapted to execute instructions configured in hardware, software, or a combination thereof. For example, mail cache server 62 may include software instructions for storing one or more interim updates for a variety of vehicles, VSMs 42, ECUs 46, etc.—e.g., in a file directory or the like. As will be discussed below, when interim updates (once stored in cache server 62) later are being delivered to vehicle 12, cache server 62 may be configured to control or regulate the installation of the updates at the target vehicle (e.g., vehicle 12). For example, in one embodiment, cache server 62 may determine a desirable order or sequence in which to provide the updates to vehicle 12—and then provide the updates in that sequence. Cache server 62 may buffer the delivery of interim updates to allow time for vehicle installation, or cache server 62 may receive acknowledgement from vehicle 12 that a previous update has been received and installed prior to sending the vehicle 12 a subsequent update. In another embodiment, cache server 62 may determine the desirable sequence and then provide additional data to vehicle 12 along with providing the stored e-mail messages. For example, cache server 62 may instruct or command vehicle 12 to install the update messages in a predetermined order (i.e., predetermined by cache server 62 or another backend system component). Thereafter, the vehicle 12 may receive these instructions from the cache server 62 and sequentially install the updates—according to the instructions/command. In other implementations, a combination of these methods may be used. Additional techniques are contemplated herein.

In at least one embodiment, backend e-mail server 28 may collect information and maintain a log of interactions between vehicle 12 and the mail cache server 62. For example, backend e-mail server 28 may store or log a variety of information pertaining to the subscriber status of vehicle 12; non-limiting examples include: the software versions of ECUs 46 in vehicle 12; the updates downloaded by and/or installed within vehicle 12; delivery and installation receipts from vehicle 12 indicating that a particular update has been installed and implemented therein; any pending software and/or firmware updates (e.g., those stored in mail cache server 62); and the like. Further, this data log for the particular vehicle may be updated regularly, and this procedure may be carried out for any suitable number of vehicles. In at least one embodiment, this procedure is carried out for all telematics-equipped vehicles made and sold by a manufacturer for a predetermined duration regardless of whether all the telematics-equipped vehicles are subscriber vehicles.

It should be appreciated that using the cache server 62 (which is outside the secure area network 22) may improve backend security. For example, the cache server 62 may be adapted to participate in numerous direct, bi-directional communications with external entities which may or may not be malicious, whereas the mail server 28, being located within the secure area network 22 (e.g., and behind additional firewalls 20, 24), may be required to communicate less with such external entities thereby minimizing potentially hostile or malicious attacks at the backend system 36.

FIG. 1 also illustrates electronic device 34—shown here as a personal computer. This device 34 may be any suitable device used by a vehicle user (e.g., an owner, lessee, or other person authorized to use vehicle 12). Or the device 34 may be any suitable device (or devices) used by engineers, service technicians, and the like. In at least one embodiment, the device 34 is adapted to receive analyzed data from backend e-mail server 28 (e.g., associated with installed and/or pending updates, out-of-date software and/or firmware versions in an associated vehicle ECU, etc.). For example, in one implementation, the device 34 may be used by an authorized user of vehicle 12 enabling the user to receive information regarding the status of any associated vehicle updates.

Non-limiting examples of the electronic device 34 include a cellular telephone, a personal digital assistant (PDA), a Smart phone, a personal laptop computer or tablet computer having two-way communication capabilities, a netbook computer, a notebook computer, or any suitable combinations thereof. In at least one embodiment, the device 34 comprises application software that enables the device 34 to communicate with backend system 36 via land network 26, wireless carrier system 14, etc.

Method—

Turning now to FIG. 3, there is shown a method 300 of remotely providing vehicle system module updates. The method begins with step 305 wherein a subscription agreement—e.g., a backend services agreement—is established between a user of the vehicle 12 and the backend system 36 (hereafter, when the user is a party to the agreement, the vehicle may be referred to as a subscriber vehicle). In some implementations, the backend services agreement may occur at the time of vehicle purchase or lease—e.g., the user may be sold a subscription for an initial duration or may be provided a trial period subscription. In other instances, the backend services agreement may be established at any time during the usable life of the vehicle 12. It should be appreciated that in one embodiment, this agreement is applicable only to vehicle 12 having a telematics unit 42a therein (or vehicles like it)—e.g., wherein unit 42a includes at least one cellular chipset. In this manner, the chipset is activated and used by the WSP and associated with the backend services agreement. While the subscription is active, the vehicle 12 may receive software and/or firmware updates in e-mail messages from backend e-mail server 28 when such updates become available. Upon receipt of the message(s), vehicle 12 may download such e-mail messages from backend system 36 (e.g., e-mail server 28), extract the updates (e.g., which may or may not require decryption), and then install the updates. Thus during a subscription period, the order of the installation of such updates may be governed according to when the vehicle receives e-mail messages from the server 28.

In step 310 which follows, a lapse in the subscription agreement occurs. Non-limiting examples include: the user of vehicle 12 actively terminates the agreement, the backend system 36 actively terminates the agreement, the agreement is not renewed, etc. In some instances, this occurs when the vehicle 12 is transferred to a new user; and at other times this occurs with the same user. During the subscription lapse period—regardless of the reason for the lapse—backend services may be terminated or limited. Thus, in at least one embodiment, the cellular chipset may be unable to receive software and/or firmware updates from the backend system.

During the lapse period, backend system 36 may release one or more new software and/or firmware updates for vehicle 12—or more specifically, for one or more of the ECUs 46 in VSMs 42. In step 315, the backend system 36 may provide these updates to the backend e-mail server 28 (e.g., more specifically, to mail server 54). For each update received by mail server 54, server 54 may determine whether the update applies to vehicle 12. In making this determination, server 54 may determine the VSMs 42, ECUs 46, last-installed software and/or firmware versions on VSMs/ECUs, etc. of vehicle 12. If server 54 determines that the update applies, it may create an e-mail message that includes the software and/or firmware update; and in some instances, some portion of the e-mail message may be encrypted.

In step 320 which follows, the backend e-mail server 28 (e.g., the mail server 54) may determine that no active backend services agreement exists with vehicle 12 and consequentially transmit the e-mail message containing the update to the content delivery server 30 (e.g., more specifically, the cache server 62). Thus, the transmission may be sent via the secure area network 22 through firewall 20 and the carrier DMZ 18 to server 30. In another embodiment, the backend e-mail server 28 may attempt to send the message to vehicle 12; however, the message is determined to be undeliverable (e.g., due to a lack of connectivity). For example, a bounce message may be received indicating the undeliverable status; thereafter, the message may be provided to the cache server 62.

Upon receipt of the e-mail message at the cache server 62, server 62 may store the e-mail message with the associated software and/or firmware update [step 325]. In one embodiment, cache server 62 periodically attempts delivery to vehicle 12. And in at least one other embodiment, cache server 62 stores the e-mail messages until prompted by backend e-mail server 28 to deliver them to vehicle 12.

In step 330, the backend services agreement is renewed or otherwise becomes active again. For example, the original user may renew the services. Or a different user (e.g., a second owner) establishes his/her first agreement with backend system 36. Other manners of establishing such an agreement associated with vehicle 12 are also contemplated herein.

In response to step 330, the content delivery server 30 (e.g., more specifically, cache server 62) may be prompted to deliver the stored e-mail messages comprising the updates [step 335]. This prompt may originate at the backend e-mail server 28 or any other suitable computer or server associated with backend system 36.

Figure 4:
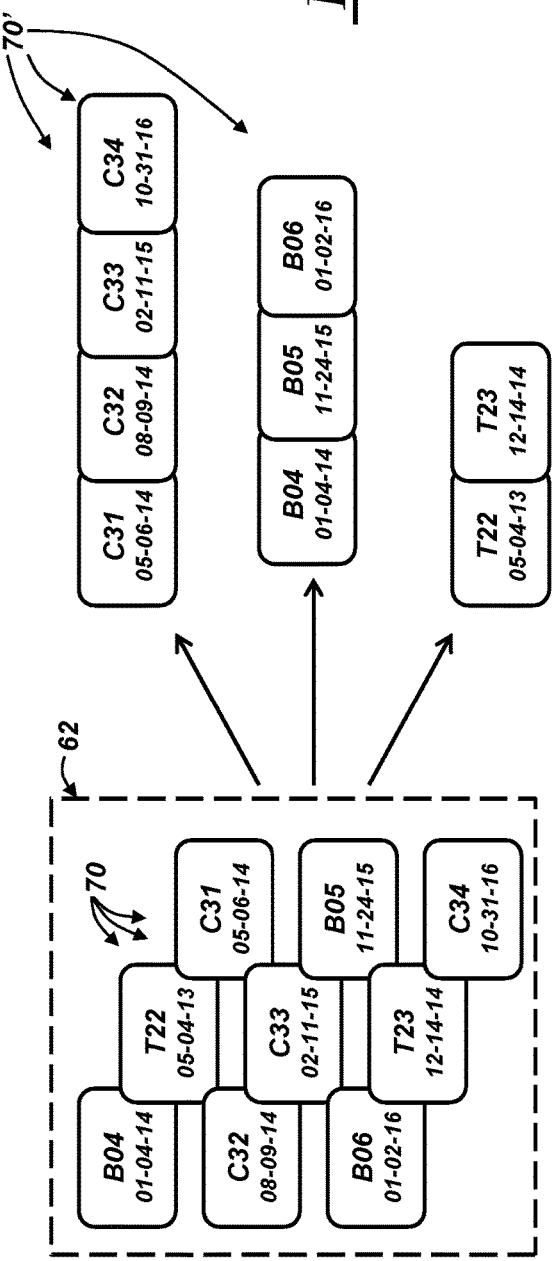
FIG. 4 is a schematic diagram illustrating cached e-mail messages at a mail cache server of the communication system.

In step 340, the content delivery server 30 determines a suitable installation sequence or sequences for the e-mail messages (and/or their respective updates). FIG. 4 illustrates cache server 62 storing multiple messages 70 for target vehicle 12. Messages 70 may be stored in any order—chronological or otherwise. FIG. 4 also shows that in step 340, server 62 may determine a sequence or desirable order in which to install the updates at vehicle 12 (see messages 70'). In at least one embodiment, messages 70' are chronologically organized by cache server 62. In at least one embodiment, cache server 62 categorizes the e-mail messages according to the ECU 46 which requires updating. For example, multiple sequences are determined for each of the VSMs 42 and their respective ECUs 46. For example, messages C31, C32, C33, C34 may pertain to the center stack module or vehicle head unit VSM 42; thus, the software and/or firmware update of C31 may be installed first, then C32, . . . and finally C34. Again, cache server 62 may instruct vehicle 12 to install them in this order. Or cache server 62 may deliver these messages one at a time—not delivering the next sequential message 70' until the installation of the previous update is determined. Similar procedures may be performed for messages B04, B05, B06 for a brake system VSM 42 and T22, T23 for the telematics unit VSM 42a.

It should be appreciated that in some instances, installation at vehicle 12 of updates for separate VSMs 42 may occur concurrently, if desired. For example, C31 could be installed concurrently with T22, whereas T22 may not be installed concurrently with T23. Further, skilled artisans will appreciate that some updates are not sensitive to the chronological order of installation, whereas others are. Thus, in some instances, cache server 62 may not govern the installation of all updates in a particular order. In another embodiment, updates could be installed according to other priorities. One non-limiting example could be a series of updates pertaining to vehicle safety. For example, if the updates B04-B06 to the brake system VSM 42 had a higher priority than the center stack VSM messages C31-C34, then the updates associated with the brake system could be installed first.

Returning to FIG. 3, once the cache server 62 has determined a desirable order or sequence of installation, then in step 350, server 62 may transmit those e-mail messages 70' to the vehicle 12. Cache server 62 may send the messages 70' via the carrier DMZ 18, the carrier firewall 16, and the wireless carrier system 12 to vehicle 12.

In step 355, vehicle 12 may download and receive the e-mail messages, extract the update(s) from each message, and sequentially install the updates according to the instructions of cache server 62. Conversely, if the cache server 62 provides at least some of the updates severally (e.g., one or two at a time), vehicle 12 may install these as it receives them. It should be appreciated that vehicle 12 receives these updates via a cellular transmission and via the cellular chipset within telematics unit 42a. Upon receipt, the updates may be distributed to the appropriate VSM 42 via network connection 44 and then installed according techniques known to skilled artisans.

In at least some embodiments, the update is a reflash update requiring the particular VSM 42 to be inoperable or unusable during the installation. For example, vehicle 12 may be drivable when the center stack VSM 42 is being reflashed—although the module may not provide any music or other entertainment audio or video during the installation. However, other VSMs 42 may require the vehicle to be stationary during reflash. For example, in some update installations (e.g., such a reflash update of the brake system VSM 42), the vehicle may be inoperable or at least the transmission may be required to be in PARK while performing the installation. In one embodiment, vehicle 12 may inhibit the vehicle user from operating the vehicle 12 during the installation.

Following step 355, the method 300 may end. In at least one embodiment, the installation of updates at the VSM(s) 42 may be provided via one or more electronic devices 34 (e.g., via the internet). For example, server 28 may provide aggregated vehicle data indicating the installed update(s), as well as other vehicle information such as pending updates (updates located in e-mails of cache server 30), out-of-date software and/or firmware versions in an associated vehicle ECU, and the like.

Other embodiments also exist. For example, in the examples above, content delivery server 30 determines and/or instructs the vehicle 12 to install the updates in a determined order or sequence. However, this instruction could originate at the backend e-mail server 28 or other suitable backend server instead. For example, once the vehicle is again a subscriber vehicle, the server 28 could send an instructive e-mail directly to vehicle 12 (via the secure area network 22, firewalls, 16, 20, DMZ 18, and wireless carrier system 12). The instructive e-mail could include a number of updates to be received from the cache server 62 and an order in which to install them. Accordingly, the VSMs 42 in vehicle 12 could install them in that order.

Thus, there has been described a method of remotely providing updates to vehicle system modules. Further, there has been described a method of receiving such updates and installing them in the vehicle. In at least some implementations, the updates are installed at the vehicle in a predefined order—e.g., in accordance with instructions or procedures of a backend e-mail server, a content delivery server, or both.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of remotely providing system module updates for a vehicle, comprising the steps of:

generating at a backend server of a vehicle backend system an electronic message (e-mail) that includes an update for a first vehicle system module (VSM) in the vehicle;

determining whether the vehicle is presently associated with a backend services agreement that is active such that the e-mail is presently deliverable to the vehicle from the vehicle backend system;

when it is determined that the vehicle is not presently associated with a backend services agreement that is active such that the e-mail is not presently deliverable to the vehicle from the vehicle backend system due to the backend services agreement being inactive or non-existent, then:

sending the e-mail from the backend server to a mail cache server, wherein the mail cache server is separate from the backend server;

storing the e-mail at the mail cache server, the mail cache server being associated with the backend system; and when the vehicle becomes associated with a backend services agreement that is active, then sending a notification from the backend server to the mail cache server that causes the mail cache server to deliver the e-mail stored at the cache server to the vehicle via a cellular link so that the update may be applied to the first VSM; and when it is determined that the vehicle is presently associated with a backend services agreement that is active such that the e-mail is presently deliverable to the vehicle from the vehicle backend system, delivering the e-mail from the backend server to the vehicle without having to send the e-mail to the mail cache server.

2. The method of claim 1, wherein the e-mail is generated at the backend server in communication with a secure area network, wherein the cache server is outside the secure area network, and wherein the backend server is within the secure area network.

3. The method of claim 2, wherein the e-mail is addressed to the vehicle using a vehicle identifier, a VSM identifier, or an electronic control unit (ECU) identifier.

4. The method of claim 3, wherein the e-mail is addressed using a domain name and the identifier is a vehicle identification number (VIN).

5. The method of claim 1, wherein the determining step further includes attempting to transmit the e-mail to the vehicle and receiving an indication that the e-mail was not delivered to the vehicle, and thereafter storing the e-mail at the cache server.

6. The method of claim 1, further comprising storing a plurality of similarly generated e-mails at the cache server, wherein some of the e-mails are associated with the vehicle and other e-mails are associated with other vehicles.

7. The method of claim 1, further comprising:
storing a plurality of similarly generated e-mails at the cache server for the vehicle, wherein at least some of the e-mails comprise different updates for the first VSM or a second VSM;
determining an installation sequence of at least some of the updates associated with the e-mails; and
transmitting the e-mails to the vehicle with an instruction to install the at least some of the updates in a predefined sequence, or transmitting the e-mails to the vehicle in a determined sequence, wherein a next sequential e-mail is not transmitted to the vehicle until a previous sequential e-mail is received and its respective update is installed in one of the first or second VSMs.

8. The method of claim 7, wherein the installation of each update is logged at the backend system.

9. The method of claim 1, further comprising providing access to vehicle data associated with the update via an internet connection.

10. A method of receiving system module updates for a vehicle from a remotely located backend system, comprising the steps of:
ceasing to receive e-mail from the backend system as a result a termination of a backend services agreement between a user of the vehicle and the backend system, wherein the backend services agreement provides for the carrying out of cellular communications between the vehicle and the backend services facility using a wireless service provider;
after ceasing to receive e-mail from the backend system, receiving an e-mail at the vehicle via a cellular link from a cache server which stored the e-mail during a subscription lapse period, wherein the cellular link is at least partly provided by the wireless service provider in response to a renewal of the backend services agreement or in response to a new backend services agreement, wherein the subscription lapse period is defined by the termination of the backend services agreement and either the renewal of the backend services agreement or in response to a new backend services agreement, wherein the backend system includes a backend server that is configured to send the e-mail to the cache server so that the e-mail is stored in the cache server during the subscription lapse period, and wherein the cache server is separate from the backend server;
extracting a software update or a firmware update from the e-mail; and
installing the software or firmware update at a vehicle system module (VSM) in the vehicle.

11. The method of claim 10, further comprising receiving a plurality of e-mails via the cellular link, wherein the plurality of e-mails were stored at the cache server during the subscription lapse period.

12. The method of claim 11, further comprising: installing an update extracted from one of the plurality of e-mails; sending an indication of the installation to the backend system; and then receiving another of the plurality of e-mails.

13. The method of claim 11, further comprising: receiving an instruction e-mail from the backend system; and installing updates in each of the plurality of e-mails according to a command in the instruction e-mail.

14. A method of remotely providing system module updates for a vehicle, comprising the steps of:
generating one or more electronic messages, at a remote server, that each include at least part of a software or firmware update for a first vehicle system module (VSM) of the vehicle;
determining whether the vehicle is presently associated with an active first backend services agreement such that communications between the remote facility and the vehicle can be carried out;
when it is determined that the vehicle is presently associated with an active first backend services agreement, then sending the one or more electronic messages to the vehicle; and
when it is determined that the vehicle is not presently associated with an active first backend services agreement, then:
storing the one or more electronic messages at a cache server that is separate from the remote server;
after storing the one or more electronic messages at the cache server, receiving an indication that the vehicle is presently associated with an active second backend services agreement, wherein the active second backend services agreement is the active first backend services agreement or a new active backend services agreement; and
in response to receiving the indication that the vehicle is presently associated with an active second backend services agreement, notifying the cache server thereby causing the one or more electronic messages to be delivered to the vehicle.

15. The method of claim 14, wherein the generating step further comprises generating a plurality of electronic messages at the remote server, and wherein the method further comprises the steps of:
determining an installation sequence for each of the one or more electronic messages; and
transmitting the one or more electronic messages to the vehicle with an instruction to install the software or firmware included in the one or more electronic messages according to the determined installation sequence, or transmitting the one or more electronic messages to the vehicle according to the determined installation sequence, wherein a next sequential electronic message is not transmitted to the vehicle until a previous sequential electronic message is received and the software or firmware of the previous sequential electronic message is installed on the first VSM.

16. The method of claim 14, wherein the remote server is within a secure area network and wherein the cache server is outside the secure area network.

* * * * *